United States Patent
Sakano et al.

(10) Patent No.: US 8,236,195 B2
(45) Date of Patent: Aug. 7, 2012

(54) FLUORINE-CONTAINING CURABLE COMPOSITION

(75) Inventors: Yasunori Sakano, Annaka (JP); Noriyuki Koike, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 202 days.

(21) Appl. No.: 12/351,651

(22) Filed: Jan. 9, 2009

(65) Prior Publication Data

US 2009/0179174 A1   Jul. 16, 2009

(30) Foreign Application Priority Data

Jan. 16, 2008 (JP) ................. 2008-007286

(51) Int. Cl.
| | |
|---|---|
| C09K 3/00 | (2006.01) |
| C08G 59/00 | (2006.01) |
| C08G 59/40 | (2006.01) |
| C08G 59/50 | (2006.01) |
| C08G 59/62 | (2006.01) |

(52) U.S. Cl. ............ 252/182.15; 528/119; 528/121; 528/123; 528/401

(58) Field of Classification Search ........... 528/119, 528/121, 123, 401; 252/182.15
See application file for complete search history.

(56) References Cited

U.S. PATENT DOCUMENTS

| | | | | |
|---|---|---|---|---|
| 3,720,639 | A | * 3/1973 | Griffith | 523/456 |
| 4,816,545 | A | * 3/1989 | Re et al. | 528/401 |
| 5,665,846 | A | 9/1997 | Sato et al. | |
| 5,919,886 | A | 7/1999 | Matsuda et al. | |
| 6,111,050 | A | 8/2000 | Yamaguchi et al. | |
| 2006/0276648 | A1 * | 12/2006 | Yamaguchi | 544/357 |

FOREIGN PATENT DOCUMENTS

| | | |
|---|---|---|
| JP | 8-199070 A | 8/1996 |
| JP | 9-077777 A | 3/1997 |
| JP | 11-092547 A | 4/1999 |
| JP | 2007-119688 A | 5/2007 |

* cited by examiner

*Primary Examiner* — Peter F Godenschwager

(74) *Attorney, Agent, or Firm* — Birch, Stewart, Kolasch & Birch LLP

(57) ABSTRACT

A fluorine-containing curable composition containing (A) A fluorine-containing amino compound having primary or secondary amino groups at both ends, said compound being represented by the formula (1):

$$Y\text{-}Q\text{-}Rf\text{---}(X\text{---}Rf)_n\text{-}Q\text{-}Y \qquad (1)$$

wherein Rf is a divalent perfluorooxyalkylene group, each Q is independently a divalent organic group having 1 to 20 carbon atoms and, optionally, containing an oxygen atom and/or a nitrogen atom, X is a divalent organic group having 1 to 20 carbon atoms and, optionally, containing an oxygen atom and/or a nitrogen atom, Y is an organic group having a primary or secondary amino group and 1 to 20 carbon atoms and, optionally, containing an oxygen atom, and n is an integer of from 1 to 20, (B) An epoxy compound having at least two epoxy groups in a molecule, in an amount such that the amount of the epoxy groups is 0.1 to 10 moles per mole of the amino groups of component (A), and (C) At least one alcohol containing fluorine atoms and represented by the following formula (2) in an amount such that the amount of the alcoholic hydroxyl group is 0.001 to 0.5 mole per mole of the amino groups of component (A): $Rf'(CH_2OH)_m$ (2), wherein m is an integer of 1 or 2, Rf' is a monovalent or divalent group containing 2 to 300 fluorine atoms, and at least one fluorine atom or at least one trifluoromethyl group is bonded to a carbon atom to which site the methylol group is bonded.

8 Claims, No Drawings

FLUORINE-CONTAINING CURABLE COMPOSITION

BACKGROUND OF THE INVENTION

1. Field of the Invention

The present invention relates to a fluorine-containing curable composition, more specifically a three-liquid or two-liquid type curable composition which cures more rapidly at room temperature, compared to conventional ones, on account of incorporation of a fluorine-containing alcohol.

2. Description of the Prior Art

Epoxy resins cure easily at a temperature of from room temperature to about 100° C., without causing by-products of a low molecular weight in curing. Accordingly, they are used widely in molded articles, sealants, and adhesives. However, because the epoxy resins show poor solvent resistance and chemical resistance, they are unsuitable to applications where they might be in contact with chemicals.

Meanwhile, fluorine-containing compounds, especially perfluoro-polyethers, have excellent resistance to solvents and to chemicals, and are used in curable compositions. For example, Japanese Patent Application Laid-Open No. 08-199070/1996 discloses a composition to be cured via a hydrosilylation reaction between a perfluoro-polyether compound having a terminal vinyl group and a compound having an Si—H group. Japanese Patent Application Laid-Open No. 09-077777/19967 discloses a perfluoro-polyether composition curable via a condensation reaction. However, the former has a problem that properties of a resultant cured material, such as chemical resistance, vary largely, depending upon species and amounts of a curing catalyst and a reaction controlling agent, because the hydrosilylation reaction is carried out at or below a temperature of 100 degrees Centigrade. The latter composition may cause an environment concern because low molecular weight by-products occur in the condensation reaction, such as alcohols and ketones.

Japanese Patent Application Laid-Open No. 11-092547/1999 discloses a curable composition containing a perfluoropolyether compound having secondary amino groups at both ends of the fluoro-polyether and a fluorine-containing compound having at least three epoxy groups in a molecule. That curable composition is curable even at room temperature to give a cured material which shows a small change in volume in various solvents and high resistance to solvents and chemicals. However, its curing rate at room temperature is not satisfactory, so that improvement is desirable.

SUMMARY OF THE INVENTION

A purpose of the present invention is to provide a fluorine-containing curable composition which can be cured in a shorter period of time, compared to conventional ones, even at room temperature to attain a curd material excellent in solvent resistance and chemical resistance.

The present invention is a fluorine-containing curable composition containing
(A) A fluorine-containing amino compound having primary or secondary amino groups at both ends, said compound being represented by the formula (1):

wherein Rf is a divalent perfluorooxyalkylene group,
each Q is independently a divalent organic group having 1 to 20 carbon atoms and, optionally, containing an oxygen atom and/or a nitrogen atom, X is a divalent organic group having 1 to 20 carbon atoms and, optionally, containing an oxygen atom and/or a nitrogen atom, Y is an organic group having a primary or secondary amino group and 1 to 20 carbon atoms and, optionally, containing an oxygen atom, and n is an integer of from 1 to 20, (B) An epoxy compound having at least two epoxy groups in a molecule, in an amount such that the amount of the epoxy groups is 0.1 to 10 moles per mole of the amino groups of component (A), and (C) At least one alcohol containing fluorine atoms and represented by the following formula (2) in an amount such that the amount of the alcoholic hydroxyl group is 0.001 to 0.5 mole per mole of the amino groups of component (A):

wherein m is an integer of 1 or 2, Rf' is a monovalent or divalent group containing 2 to 300 fluorine atoms, and at least one fluorine atom or at least one trifluoromethyl group is bonded to a carbon atom to which the methylol group is bonded.

The fluorine-containing alcohol in the present composition promotes curing of the composition, so that a curing rate at room temperature is higher than that of conventional compositions.

DESCRIPTION OF THE PREFERRED EMBODIMENTS

Because the present composition cures even at room temperature, components (A), (B) and (C) are usually provided separately in a form of three-liquid type or in two-liquid type with (B) and a mixture of (A) and (C). These are mixed together immediately before use to form one liquid. Thus, the two-liquid type of the composition comprises
(I) a first liquid which comprises the fluorine-containing amino compound having primary or secondary amino groups at both ends, represented by the formula (1) and at least one alcohol containing fluorine atoms and represented by the formula (2) in an amount such that the amount of the alcoholic hydroxyl group is 0.001 to 0.5 mole per mole of the amino groups of component (A), and
(II) a second liquid which comprises the epoxy compound having at least two epoxy groups in a molecule. These are provided simultaneously or separately and used in an amount such that the amount of the epoxy groups of the second liquid is 0.1 to 10 moles per mole of the amino groups of the first liquid.

If the components are delivered and stored at a low temperature, these may be in a form of one-liquid type. In a two-liquid type, it is possible to have component (C) mixed in the component (B), epoxy compound. However, component (C) is preferably mixed with (A) the fluorine-containing amino compound, on account of compatibility. Any mixing means may be used, such as mixers and kneaders.

The fluorine-containing amino compound having primary or secondary amino groups at both ends is represented by the following formula (1):

wherein Rf is a divalent perfluorooxyalkylene group, preferably a perfluorooxyalkylene group comprising repeating units composed of a fluoroalkylene group having at most three carbon atoms and an oxygen atom. Examples of such repeating units may be ones represented by the following formula. Plural kinds of the repeating units represented by the formula may be present together.

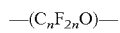

wherein is an integer of from 1 to 3, and the repeating units may be branched.

A particularly preferred Rf has the following structure:

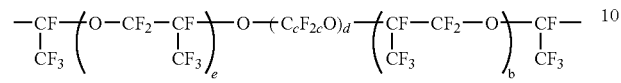

wherein a and b are independently an integer of from 1 to 200, preferably from 1 to 150, provided that an average of a+b is 2 to 200, preferably 10 to 150, and c and d are independently an integer of from 1 to 4.

X in formula (1) is a divalent group having 1 to 20 carbon atoms and, optionally, containing an oxygen atom and/or a nitrogen atom. When n is 2 or larger, X may be different from each other. X may be as follows:

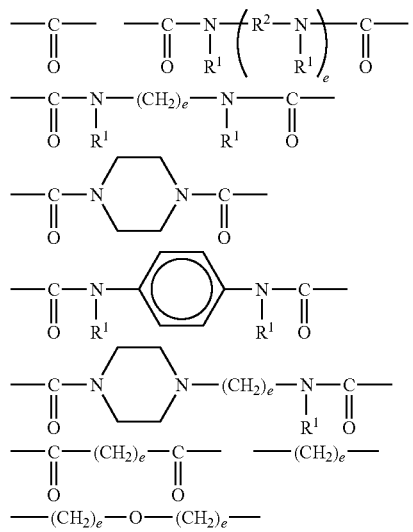

wherein e is an integer of from 0 to 6, and each $R^1$ is independently a hydrogen atom or a monovalent hydrocarbon group with 1 to 14 carbon atoms.

Among these, particularly preferred are the following groups:

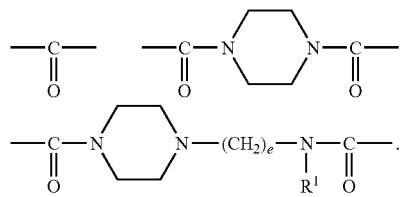

Examples of $R^1$ include a hydrogen atom; unsubstituted monovalent hydrocarbon groups, such as alkyl groups such as methyl, ethyl, propyl, butyl, hexyl, cyclohexyl, octyl and decyl groups; alkenyl groups such as vinyl, ally, propenyl, butenyl and hexenyl groups; aryl groups such as phenyl, tolyl, xylyl and naphtyl groups; and aralkyl groups such as benzyl and phenylethyl groups, or these groups in which a part or the whole of the hydrogen atoms are substituted with a fluorine atom(s), preferred are a hydrogen atom, and methyl, ethyl and aryl groups.

Y in formula (1) is an organic group which has a primary or secondary amino group and 1 to 20 carbon atoms and, optionally, contains an oxygen atom. Examples of Y include the following:

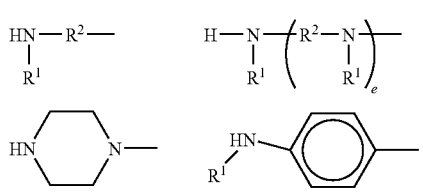

wherein e and $R^1$ are as defined above.

$R^2$ in the aforesaid formula is a divalent hydrocarbon group having 1 to 20 carbon atoms, and may be partly substituted with a fluorine atom(s). Examples of it include a methylene, ethylene, propylene and butylenes groups and the following groups:

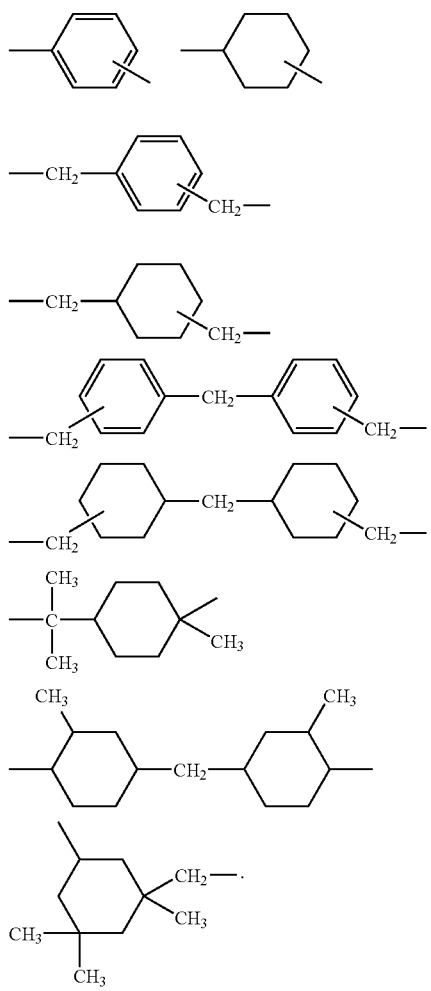

Among these, particularly preferred are

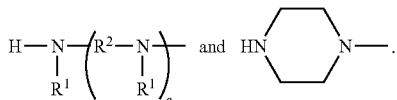

Q in formula (1) is independently a divalent organic group having 1 to 20 carbon atoms, which may optionally contain an oxygen atom and/or a nitrogen atom, such as

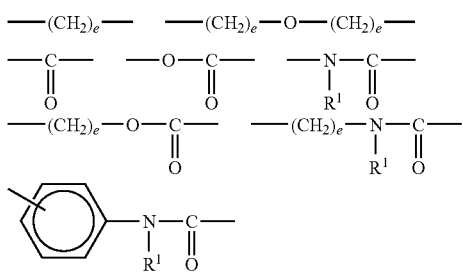

wherein e and $R^1$ are as defined above.
Among these, particularly preferred are:

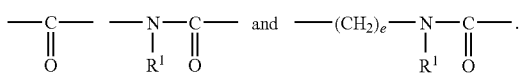

Particularly preferred examples of the fluorine-containing amino compound represented by formula (1) are the following ones or mixtures thereof.

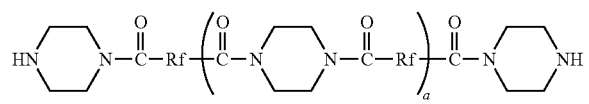

wherein an average of a is 0 to 2,

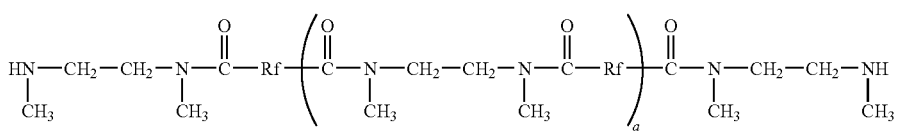

wherein
Rf:

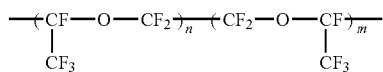

wherein an average of a is 0 to 2, and an average of n+m is 10 to 150,

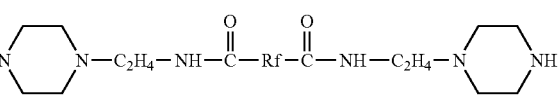

wherein
Rf:

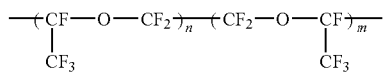

wherein an average of n+m is 10 to 150.

Examples of the compound having at least two epoxy groups in a molecule (B) include bisphenol A epoxy resins, bisphenol F epoxy resins, bisphenol AF epoxy resins, phenol novolak epoxy resins, hydrogenated bisphenol A epoxy resins, glycidyl amines such as triglycidyl-p-aminophenol, and diglycidyl aniline; aliphatic epoxy resins such as polypropyleneglycol diglycidylether, trimethylolpropane triglycidylether, pentaerythritol polyglycidylether, and glycerine triglycidylether; trigycidyl isocyanurate; and epoxy compounds having the following structures:

-continued

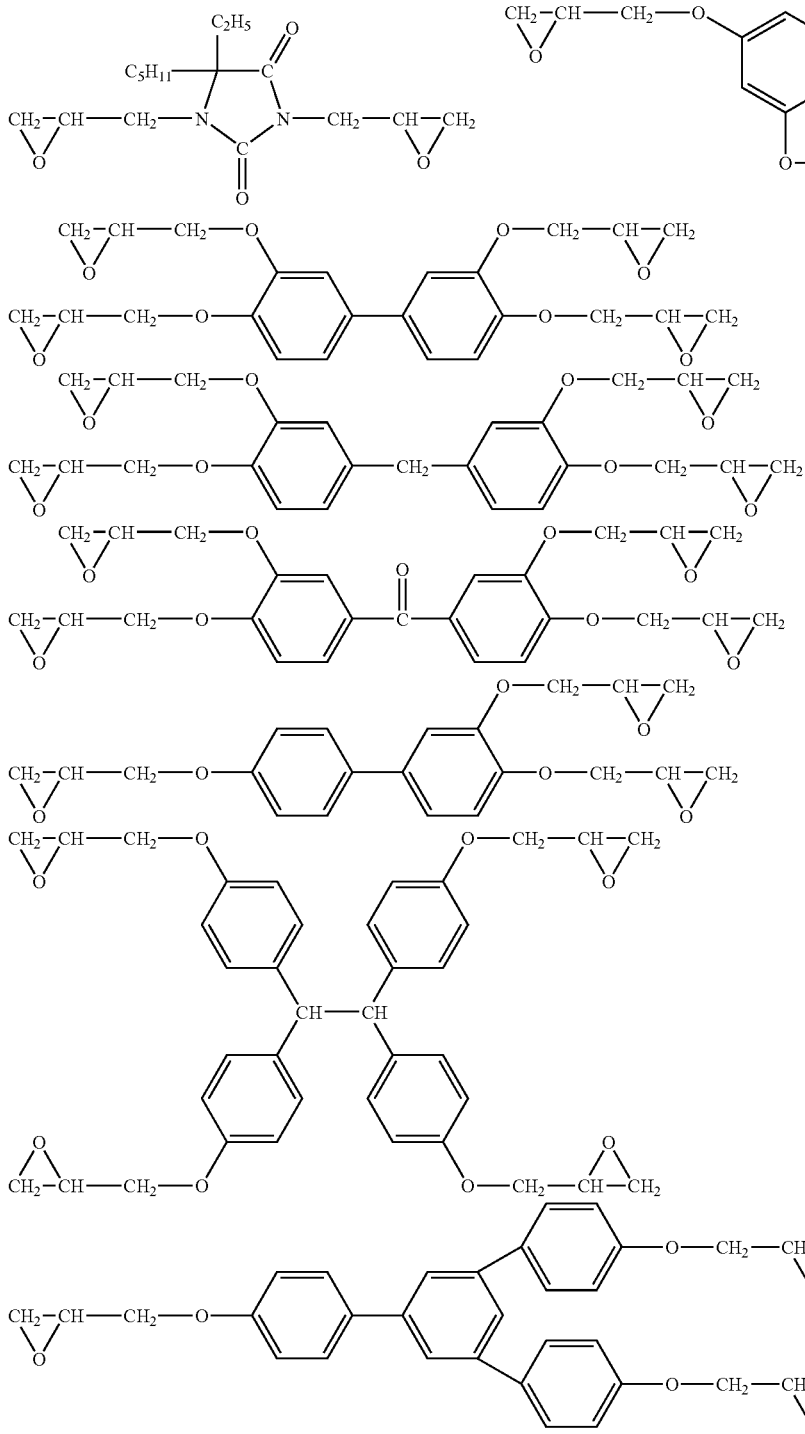

Among these, particularly preferred are bisphenol A epoxy resins, bisphenol F epoxy resins, bisphenol AF epoxy resins, hydrogenated bisphenol A epoxy resins, triglycidyl-p-aminophenol, diglycidyl aniline, trimethylolpropane triglycidylether, pentaerythritol polyglycidylether, and glycerine triglycidylether.

The composition of the invention shows a higher curing rate, compared to prior art fluorine-containing compounds, as the composition comprises the fluorine-containing alcohol (C). It is believed that this is because the fluorine atom or trifluorometyl group bonded to a carbon atom adjacent to a methylol group acts as an electron-withdrawing group to have a proton of the methylol group work as acidic catalyst, though the invention shall not be limited by this theory. In this point, the composition of the present invention differs from the composition of Japanese Patent Application Laid-Open No. 2007-119688, which comprises an epoxy resin modified with a fluorine-containing alcohol.

The fluorine-containing alcohol used in the present invention is represented by the following formula (2):

$$Rf'(CH_2OH)_m \quad (2)$$

wherein m is 1 or 2, Rf' is a monovalent or divalent group containing 2 to 300 fluorine atoms, and at least one fluorine atom or at least one trifluoromethyl group is bonded to a carbon atom to which the methylol group is bonded. A site of Rf' to which site the methylol group is bonded is preferably represented by any of the following formulas (i) to (iii):

$$-CF_2- \quad (i)$$

$$-CF(CF_3)- \quad (ii) \text{ and}$$

$$-C(CF_3)_2- \quad (iii).$$

In the formulas (i) to (iii), the remaining moiety of Rf' from which the terminal carbon atom is excepted is attached to the side opposite the side on which the methylol group is bonded. This remaining moiety may be a hydrogen or fluorine atom. In formula (2), m=2. When Rf' is a divalent group, another methylol group may be bonded. That is, the fluorine-containing alcohol may be ones represented by the following formulas:

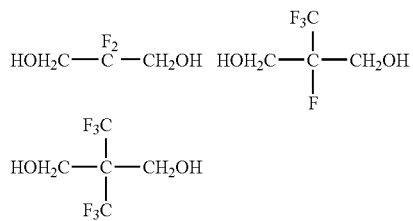

Preferred fluorine-containing alcohol may be (1) such that Rf' is a monovalent or divalent perfluorchydrocarbon having 1 to 6 carbon atoms, or (2) one having polyether structure and having a number average molecular weight of 700 to 10,000, more preferably 800 to 6,000. The aforesaid (1) is suitable to applications which require that a less amount of the fluorine-containing alcohol is added not to remain in a cured material. The aforesaid (2) is suitable to applications which require less curing shrinkage of a cured material.

Examples of the monovalent Rf' in the alcohol (1) include fluorinated alkyl groups and fluorinated oxyalkyl groups as follows:

$$CF_3C_nF_{2n}-$$

wherein n is an integer of from 0 to 5, and Rf' may be branched, $$CF_3(CHF)_m(CF_2)_n-$$

wherein m is an integer of from 1 to 5, n is an integer of from 0 to 5, at least one (CF_2) exists at the terminal, and the remaining (CF_2) and (CHF) may be distributed at random, $$HCF_2(CF_2)_n-$$

wherein n is an integer of from 0 to 5.

Examples of the divalent Rf' in the alcohol (1) include fluorinated alkylene groups and fluorinated oxyalkylene groups as follows:

$$-C_nF_{2n}-$$

wherein n is an integer of from 1 to 6, and Rf' may be branched, $$-CF_2(C_mF_{2m}O)CF_2-$$

wherein m is an integer of from 1 to 4, and Rf' may be branched.

Examples of the monovalent Rf' in the alcohol (2) having polyether structure include:

$$CF_3OC_nF_{2n}(CF_2CF_2O)_kCF_2-$$

wherein n is 0 or 1, k is an integer of from 1 to 100, preferably from 1 to 50.

Examples of the divalent Rf' include:

$$-CF_2(C_mF_{2m}O)_kCF_2-$$

wherein m is an integer of from 1 to 4, and k is as defined above, and Rf' may be branched, $$-CF_2O(CF_2CF_2O)_p(CF_2O)_qCF_2-$$

wherein p and q are integers to give a number average molecular weight of the fluorine-containing alcohol of 700 to 10,000, preferably 800 to 6,000, and the repeating units (CF_2CF_2O) and (CF_2O) may be distributed at random.

In the present composition, the fluorine-containing amino compound and the epoxy compound are contained in such amounts that the amount of the epoxy groups of the epoxy compound is 0.1 to 10 moles, preferably 0.5 top 3 moles, more preferably 0.8 to 2 moles, per mole of the amino groups of the fluorine-containing amino compound. If the amount of the epoxy compound is outside the aforesaid range, poor curing may take place.

The fluorine-containing alcohol I used in such an amount that the amount of the alcoholic hydroxyl group of the fluorine-containing alcohol is 0.001 to 0.5 mole, preferably 0.005 to 0.3 mole, more preferably 0.01 to 0.2 mole, per mole of the amino groups of the fluorine-containing amino compound. If the amount of the fluorine-containing alcohol is less than the aforesaid lower limit, the improvement on the curing rate is insufficient, so that problems such as bleeding may take place.

The fluorine-containing curable composition of the invention may comprise, besides the aforesaid components, various conventional additives, if desired, as far as the purpose of the invention is not disturbed to attain. The additives may be added after the essential components are blended, or may be added to any liquid of a three-liquid or two-liquid system in advance. Those additives include cure-promoting agents such as tertiary amine compounds and imidazoles, carbon black such as acetylene black, reinforcing agents such as fumed silica, precipitated silica, titanium dioxide, aluminum oxide, quartz powder, carbon powder, talc and bentonite, fiber fillers such as asbestos, glass fiber and organic fiber, coloring agents such as pigments and dyes, heat resistance-improving agents such as red iron oxide and cerium oxide, cold-resistance improving agents, antirust agents, adhesion-improving agents such as β-(3,4-epoxycyclohexyl)ethyl trimethoxysilane, γ-glycidoxy propyltriethoxysilane, and γ-amino propyltriethoxysilane, and fluorinated or non-fluorinated nomofunctional epoxy compounds.

The present composition may be mixed by any known means, for instance, such as a mixer or a kneader. The mixed composition may be applied on various substrates such as metals, plastics, ceramics, and glass. In the application, the composition may be made in a desired concentration by a fluoric solvent such as 1,3-bistrifluoromethy benzene and perfluorooctane. Alternatively, the first liquid and the second liquid are each in a form separately dissolved in a solvent.

The composition of the invention is capable of curing in a shorter period of time, compared to prior art curable compositions. The composition is useful in additives or sealants for electronic components which are not allowed to be heated.

The composition can be cured in several minutes to several hours by heating at 50 to 200 degrees Centigrade. The composition is further useful in sealing materials, coating materials, tent coating material and potting materials.

EXAMPLES

Room Temperature Curing Test

Were mixed the following epoxy component, amine component, and alcohol component on a glass petri dish, and left at room temperature. Then, its surface was scratched manually with a spatula every three hours after the completion of the mixing. The time when the flowability of the surface disappeared was recorded as a curing time. The results are as shown in Table 1. The components in the table are as follows.

(A) Fluorine-Containing Amino Compound $$HN\text{-}\underset{\diagdown}{\diagup}N\text{-}\underset{O}{\overset{\|}{C}}\text{-}Rf\text{-}(\underset{O}{\overset{\|}{C}}\text{-}N\underset{\diagdown}{\diagup}N\text{-}\underset{O}{\overset{\|}{C}}\text{-}Rf)_r\text{-}\underset{O}{\overset{\|}{C}}\text{-}N\underset{\diagdown}{\diagup}NH$$

wherein the average of r is 0.1, and
Rf is represented by the following formula:

$$-(CF-O-CF_2)_n-(CF_2-O-CF)_m-$$
$$\quad\;\; |\qquad\qquad\qquad\qquad\quad |$$
$$\quad CF_3\qquad\qquad\qquad\qquad CF_3$$

wherein the average of n+m is 35.

(B) Epoxy Compound $$CH_2\text{-}CH\text{-}CH_2\text{-}O\text{-}\langle\bigcirc\rangle\text{-}N\underset{CH_2\text{-}CH\text{-}CH_2}{\overset{CH_2\text{-}CH\text{-}CH_2}{\diagup}}$$
$$\quad\diagdown\!\!\!O\diagup$$

(C-1) Fluorine-Containing Alcohol

HO—CH$_2$—CF$_2$O—(CF$_2$CF$_2$O)$_s$(CF$_2$O)$_t$—CF$_2$—CH$_2$—OH wherein s and t are such numbers as to give an average molecular weight of 1,000.

(C-2) Fluorine-Containing Alcohol

HO—CH$_2$—CF$_2$O—(CF$_2$CF$_2$O)$_u$(CF$_2$O)$_v$—CF$_2$—CH$_2$—OH wherein u and v are such numbers as to give an average molecular weight of 2,000.

(C-3) Fluorine-Containing Alcohol

CF$_3$CH$_2$OH

TABLE 1

| Composition, part by weight | Ex. 1 | Ex. 2 | Ex. 3 | Comp. 1 |
| --- | --- | --- | --- | --- |
| A | 100 | 100 | 100 | 100 |
| B | 4 | 4 | 4 | 4 |
| C-1 | 1.8 | — | — | — |
| C-2 | — | 3.6 | — | — |
| C-3 | — | — | 0.18 | — |
| Amino group/ Epoxy group/ OH group, mole ratio | 1.00/ 1.38/ 0.114 | 1.00/ 1.38/ 0.114 | 1.00/ 1.38/ 0.114 | 1.00/ 1.38/ 0 |
| Curing time, hr. | 24 | 27 | 21 | 39 |

As seen from Table 1, the curing rate of the present composition is higher, compared to that of Comparative Example, on account of the incorporation of the fluorine-containing alcohol.

INDUSTRIAL APPLICABILITY

The curable composition of the present invention cures rapidly even at room temperature, and is useful in adhesives and sealing agents for electronic components which are not allowed to be heated.

The invention claimed is:

1. A method for curing a fluorine-containing curable composition containing
   (A) a fluorine-containing amino compound having primary or secondary amino groups at both ends, said compound being represented by the formula (1):

$$Y\text{-}Q\text{-}Rf\text{—}(X\text{—}Rf)_n\text{-}Q\text{-}Y \qquad (1)$$

wherein Rf is a divalent perfluorooxyalkylene group,
   each Q is independently a divalent organic group having 1 to 20 carbon atoms and, optionally, containing an oxygen atom and/or a nitrogen atom,
   X is a divalent organic group having 1 to 20 carbon atoms and, optionally, containing an oxygen atom and/or a nitrogen atom,
   Y is an organic group having a primary or secondary amino group and 1 to 20 carbon atoms and, optionally, containing an oxygen atom, and
   n is an integer of from 1 to 20, and
   (B) an epoxy compound having at least two epoxy groups in a molecule, in an amount such that the amount of the epoxy groups is 0.8 to 2 moles per mole of the amino groups of component (A), and wherein the method comprises the steps of adding
   (C) at least one alcohol containing fluorine atoms to the aforesaid fluorine-containing curable composition in an amount such that the amount of the alcoholic hydroxyl group is 0.01 to 0.2 mole per mole of the amino groups of component (A),
   wherein the alcohol is represented by the following formula (2):

$$Rf'(CH_2OH)_m \qquad (2)$$

wherein m is an integer of 1 or 2, Rf' is a monovalent or divalent group containing 2 to 300 fluorine atoms, and at least one fluorine atom or at least one trifluoromethyl group is bonded to a carbon atom to which the methylol group is bonded, and allowing the composition to cure, wherein (C) the alcohol containing fluorine atoms, works as a catalyst.

2. The method for curing the fluorine-containing curable composition according to claim 1, wherein the site of Rf' to which the methylol group is bonded is represented by one of the following formulas (i) to (iii):

 (i)

 (ii)

 (iii).

3. The method for curing the fluorine-containing curable composition according to claim 1 or 2, wherein said Rf' is a perfluoroalkylene or perfluorooxyalkylene group having 1 to 6 carbon atoms.

4. The method for curing the fluorine-containing curable composition according to claim 1 or 2, wherein said fluorine-containing alcohol has a number average molecular weight of 700 to 10,000.

5. The method for curing the fluorine-containing curable composition according to claim 4, wherein said fluorine-containing alcohol is represented by the following formula (3):

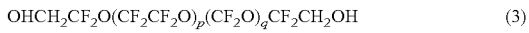 (3)

wherein p and q are an integers such that the number average molecular weight of the fluorine-containing alcohol is from 700 to 10,000, and the repeating units $(CF_2CF_2O)$ and $(CF_2O)$ may randomly be distributed.

6. The method for curing the fluorine-containing curable composition according to claim 1, wherein said Rf in formula (1) is represented by the following formula:

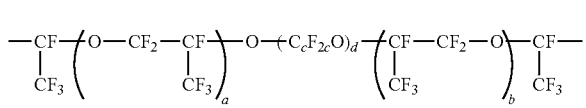

wherein each of a and b is independently an integer from 1 to 200, an average of a+b is 2 to 200, and each of c and d is independently an integer of from 1 to 4.

7. The method for curing the fluorine-containing curable composition according to claim 1, wherein said Q in formula (1) is a group represented by any of the following formulas:

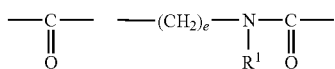

wherein $R^1$ is a hydrogen atom or a monovalent hydrocarbon group having 1 to 20 carbon atoms, wherein a part of the hydrogen atoms may be substituted with a fluorine atom, and e is an integer of from 0 to 6, X is a group represented by any of the following formulas:

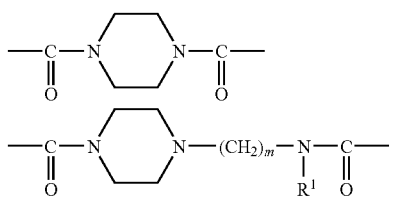

wherein $R^1$ is as defined above, and m is an integer of from 1 to 6, and

Y is a group represented by the following formula:

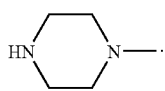

8. The method for curing the fluorine-containing curable composition according to claim 1, wherein said m is 1.

* * * * *